United States Patent [19]
Mazziotti

[11] Patent Number: 4,530,675
[45] Date of Patent: Jul. 23, 1985

[54] INTERNAL UNIVERSAL JOINT SEAL WITH MULTIPLE LIPS

[75] Inventor: Philip J. Mazziotti, Toledo, Ohio

[73] Assignee: The Zeller Corporation, Defiance, Ohio

[21] Appl. No.: 497,123

[22] Filed: May 23, 1983

Related U.S. Application Data

[63] Continuation-in-part of Ser. No. 467,131, Feb. 16, 1983.

[51] Int. Cl.³ .................... F16D 3/26; F16J 15/54
[52] U.S. Cl. .................... 464/131; 277/95; 464/14; 384/481
[58] Field of Search ............ 277/92, 95, 152, 153, 277/84, 207 R, 208, 209, 210, 211; 308/187, 187.1, 187.2; 464/11, 14, 131, 133

[56] References Cited

U.S. PATENT DOCUMENTS

| | | | |
|---|---|---|---|
| 2,773,366 | 12/1956 | Slaght | 464/131 |
| 2,896,433 | 7/1959 | Hempel | 464/131 |
| 2,896,974 | 7/1959 | Bush | 277/208 X |
| 3,052,478 | 9/1962 | Horvereid | 277/209 |
| 3,200,615 | 8/1965 | Stokely | 464/131 X |
| 3,266,269 | 8/1966 | Stokely | 464/131 |
| 3,377,820 | 4/1968 | Smith, Jr. | 464/131 |
| 3,479,840 | 11/1969 | Meyers | 464/131 |
| 3,581,524 | 6/1971 | Pitner | 464/131 |
| 3,717,394 | 2/1973 | Pitner | 464/131 X |
| 3,788,100 | 1/1974 | Pitner | 277/95 X |
| 3,822,068 | 7/1974 | Litherland | 277/208 |
| 3,906,746 | 9/1975 | Haines | 464/131 |
| 4,154,490 | 5/1979 | Kohler et al. | 464/131 X |

FOREIGN PATENT DOCUMENTS 995934 6/1965 United Kingdom ............ 277/95

Primary Examiner—Stuart S. Levy
Assistant Examiner—Daniel P. Stodola
Attorney, Agent, or Firm—Allen D. Gutchess, Jr.

[57] ABSTRACT

An internal seal is provided for a universal joint, which seal is more effective in retaining lubricant and in preventing the ingress of water and contaminants. Each trunnion of the joint is received in a bearing cup having an open end with an internal annular shoulder near the open end. The seal comprises a resilient sealing member having at least two inner circular lips which engage the trunnion near a cross body and at least two outer circular lips which engage the internal surface of the bearing cup between the open end and the annular shoulder. The sealing member further includes an additional lip which engages the annular shoulder and a spaced additional lip or ridge which engages the body adjacent the trunnion. The latter two lips serve to position the sealing member with respect to the cross and bearing cup with the sealing member being substantially enclosed by the bearing cup, which minimizes the possibility of damage to the sealing member. The internal universal joint seal provides a total of at least three seals between the sealing member and the cross and also between the sealing member and the cup to contain lubricant in the cup and to prevent the ingress of water and contaminant. In one form, the sealing member also has a longer lip which extends over upper ends of needle bearings located between the trunnion and cup to aid in retaining the needle bearings in place when the cup is separated from the trunnion.

12 Claims, 7 Drawing Figures

INTERNAL UNIVERSAL JOINT SEAL WITH MULTIPLE LIPS

This application is a continuation-in-part application of U.S. Ser. No. 467,131, filed on Feb. 16, 1983.

This invention relates to an internal universal joint seal which is more effective to contain lubricant and to prevent the ingress of water and contaminants.

Seals between crosses and bearing cups of universal joints must meet difficult conditions. Since there is relative rotational movement between the cross trunnions and the bearing cups, the seals have to provide the sealing function while encountering movement between the seals and the sealing surfaces of the cross and/or cups. The seals must also contain the lubricant in the cups between the inner surface thereof and the trunnions even during high rotational movement of the universal joint and when subject to torque during operation of the drive train in which the universal joint is located. At the same time, however, with universal joints having lubricant fittings so that the bearings can be periodically lubricated, the seals must enable some of the old lubricant to be flushed from the bearings during lubrication. In addition, the universal joint seals must be effective in preventing the ingress of water and contaminants which can quickly cause bearing failure even in small amounts. Preferably, the seals also should not project beyond the peripheries of the bearing cups so as not to inhibit assembling of the cross and the cups along with the yokes of the universal joint.

A number of seals for use between crosses and bearing cups of universal joints are known in the art. One common seal includes a resilient sealing member having one portion contoured to the shape of the cross at the juncture of the body and trunnion and another portion contoured to the shape of the surface near the open end of the bearing cup so as to provide wide areas of contact between the sealing member and both the cross and cup. Such seals, however, are sometimes less than effective, particularly when the surfaces of the cross and cup which are engaged by the sealing member are relatively rough, having circular irregularities therein. Abrasion and wear of the sealing member also can be a problem with this type of seal and universal joint surfaces. Other universal joint seals are shown in the following U.S. Pat. Nos. 2,773,367, issued to W. W. Slaght on Dec. 11, 1956; 3,138,942 issued to J. A. Kayser on June 30, 1964; 3,377,820 issued to W. J. Smith, Jr., on Apr. 16, 1968; 3,581,524 issued to A. Pitner on June 1, 1971; 3,788,100 issued to A. Pitner on Jan. 29, 1974; and 3,906,746 issued to C. W. Haines on Sept. 23, 1975.

The present invention provides an improved internal universal joint seal having multiple lips to provide more effective seals. The cross of the universal joint includes a body and four trunnions extending therefrom at mutually perpendicular angles, with the cross often having an annular shoulder at the juncture of the body and each trunnion. Each bearing cup of the universal joint with which the internal seal is used has an open end which receives one of the trunnions. The cup has a first cylindrical interior portion of one diameter adjacent the open end and a second cylindrical interior portion of a smaller diameter away from the open end, forming an annular internal shoulder between the portions and facing toward the open end.

The internal universal joint seal according to the invention includes a resilient sealing member having multiple lips engaging the first cylindrical interior portion of the cup and also having multiple lips engaging the surface of the trunnion adjacent the cross body. The sealing member has an additional lip between the two sets of multiple lips engaging the internal shoulder of the cup and a second additional lip or ridge between the two sets of multiple lips engaging the body of the cross. Where the cross body has a relatively smooth shoulder adjacent the trunnion, the second additional lip forms an additional seal. Where there is no annular shoulder, the second lip or ridge engages the body directly to retain the resilient sealing member in place between the cup and the trunnion, along with the additional lip which engages the internal shoulder of the cup. The multiple lips engaging the trunnion are effective to prevent the ingress of water and contaminants and the outer set of lips engaging the first cylindrical interior portion of the cup also enable the egress of lubricant from the cup during lubrication. This enables dirty lubricant to be flushed completely from the bearing cup if desired.

In one form, the resilient sealing member has a larger lip extending downwardly and inwardly over upper ends of needle bearings to help retain them in place when the cup and the trunnion are separated.

The sealing lips of the resilient sealing member have narrow squared or rounded ends which provide narrow lines of contact with the cross and the bearing cup. Thus, the sealing lip ends providing substantially line contact with the cross and the cup when the lips are deformed when assembled with the cross and the cup. This provides good sealing engagement with the surfaces, particularly when they have circular surface irregularities therein. In contrast, previous seals were designed to have contours fitting with associated contours of the cross and cup to provide broad engagement therebetween. Such seals do not have as effective sealing engagement with the surfaces when such surfaces tended to be rough and have irregularities therein and the seals wear rapidly.

The relatively narrow lips of the resilient sealing member also can be deformed substantially when the cross and the cup are assembled so that the seal can accommodate wider tolerance ranges in the universal joint. Also, the multiple seals form annular cavities therebetween which can trap lubricant tending to egress and water and contaminants tending to ingress. In such instances, the trapped lubricant, in turn, tends to be effective in inhibiting the ingress of contaminants and water.

The sealing member also is designed to fit within the bearing cup in a manner such that the seal does not project beyond outer surfaces of the bearing cup. This facilitates assembly of the bearing cup with the trunnion by inserting the bearing cup through an opening in the universal joint yoke. The internal seal also is protected from possible damage by being substantially located within the cup.

The seal is effective to contain the lubricant and to prevent the ingress of water and contaminants even during relative rotational movement of the trunnion and the bearing cup and also during high rotational speeds of the universal joint. At the same time, however, the seal is sufficiently soft that lubricant supplied through the cross to the needle bearings in the bearing cup can flush out the old lubricant between the seal and the bearing cup.

It is, therefore, a principal object of the invention to provide an internal universal joint seal for a universal joint having improved sealing properties with a cross and cup of the joint.

Another object of the invention is to provide an internal joint seal capable of accommodating greater tolerance ranges or dimensional variations in the cross and cups of the universal joint.

A further object of the invention is to provide an internal universal joint seal having multiple lips engaged with the cross and multiple lips engaged with the cup to provide effective lubricant and contaminant seals.

Yet another object of the invention is to provide an internal universal joint seal capable of achieving greater sealing effectiveness with surfaces of the cross and cup of the universal joint when they have circular surface irregularities thereon.

Still another object of the invention is to provide an internal universal joint seal located substantially wholly within an open end portion of the bearing cup which protects the seal from damage.

Many other objects and advantages of the invention will be apparent from the following detailed description of preferred embodiments thereof, reference being made to the accompanying drawings, in which.

Figure 1:
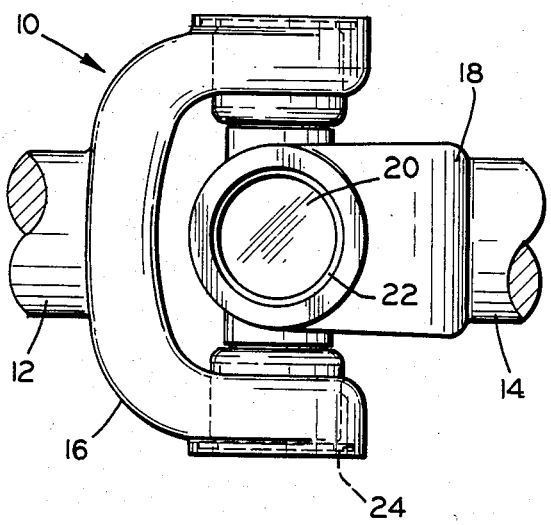
FIG. 1 is a view in elevation of an assembled universal joint connecting two shafts and embodying the invention.

Referring to FIG. 1, a universal joint embodying the invention is indicated at 10 and connects driving and driven shafts 12 and 16 in the conventional manner. The joint 10 includes two yokes 16 and 18 disposed at mutually perpendicular angles with bearing cups 20 held in arms of the yokes by suitable means, such as retaining rings 22 (FIGS. 1 and 2) which are held in grooves 24 (FIG. 1) in the arms of the yokes, as is known in the art.

Figure 2:
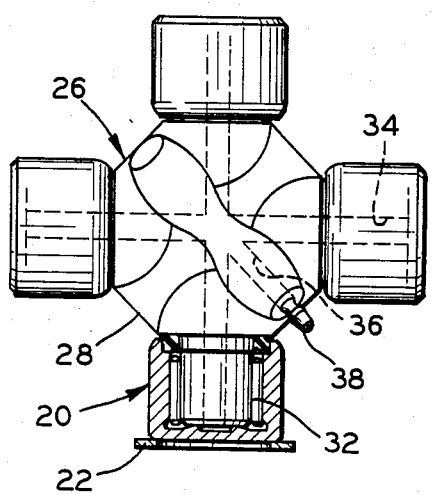
FIG. 2 is a view in elevation of the universal joint and bearing cups assembled therewith, with one bearing cup and seal shown in section.
Figure 3:
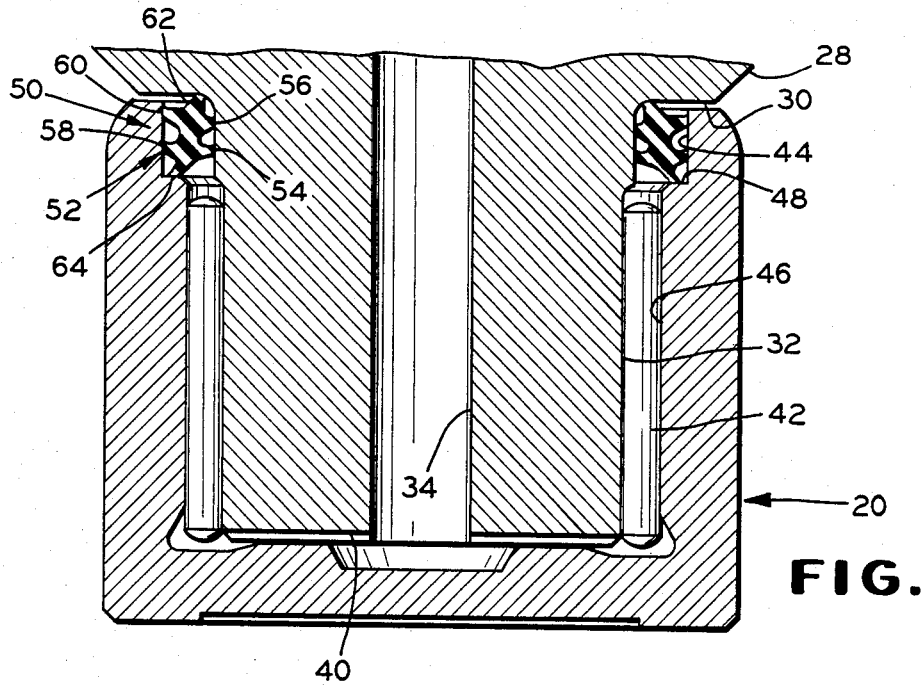
FIG. 3 is a greatly enlarged, fragmentary view in cross section of a trunnion of a universal joint cross, a bearing cup, and a universal joint seal according to the invention, in assembled relationship.

Referring to FIGS. 2 and 3, a cross 26 of the universal joint includes a body 28 with shoulders 30 from which extend trunnions 32. The body 28 and the trunnions 28 are provided with lubrication passages 34 which communicate with a supply passage 36 and a lubricant fitting 38. The passage 34 directs lubricant to the end of the trunnion 32 which has a cross passage 40 to supply the lubricant to needle bearings 42 located between the bearing cup 20 and the trunnion 32. With this arrangement, the needle bearings 42 can be lubricated periodically through the fitting 38 to minimize the possibility of the bearings drying out and the universal joint freezing.

Each of the bearing cups 20 has an open end to receive the trunnion 32 with the cup having a first cylindrical internal portion 44 of one diameter adjacent the open end and a second cylindrical internal portion 46 of smaller diameter away from the open end. An internal annular shoulder 48 is formed between the two portions 44 and 46 and faces the open end.

Resilient sealing members heretofore formed between the cups and crosses of universal joints commonly have been designed with contours conforming to the contours of the cross at the juncture of the body and trunnions and also with the contours of the open ends of the bearing cups. The purpose was to provide a large contact area which might be expected to provide better seals. However, the surfaces at the junctures of the cross body and trunnions and the contoured open ends of the bearing cups have not always been as smooth as other portions of the cross and cups. Such surfaces commonly have had circular irregularities which have prevented effective seals with the sealing member, in some instances. Also, substantial abrasion has resulted to the resilient sealing member at times where relative movement occurs between the cross and/or cup and the sealing member.

A universal joint seal 50 in accordance with the invention is provided to more effectively seal off the annular space between the bearing cup and the cross 26. The seal 50 comprises a resilient sealing member 52 made entirely of resilient material preferably of synthetic rubber with a typical hardness of 80–95 durometers, and does not require metal inserts or metal backing as some seals heretofore employed, such seals being relatively expensive. The member 52 has at least two inwardly-extending circular lips 54 and 56 which engage the trunnion 32 near the cross body 28. The circular lips 54 and 56 are narrow and engage the trunnion along narrow, annular areas to provide two seals between the sealing member 52 and the cross 26. The sealing member 52 also has two outwardly-extending circular lips 58 and 60 which engage the inner surface of the first cylindrical internal portion 44 of the bearing cup 20. These engage the surface along narrow, annular areas to provide two seals between the sealing member 52 and the cup 20.

The sealing member 52 also has an upwardly-extending narrow circular lip 62 between the inner multiple lips 54 and 56 and the outer multiple lips 58 and 60. The lip 62 engages the shoulder 30 of the cross body 28, in this instance, along a narrow, annular area to provide a third seal between the sealing member 52 and the cross 26. The sealing member 52 also has a downwardly-extending narrow circular lip 64 between the inner multiple lips 54 and 56 and the outer multiple lips 58 and 60. The lip 64 engages the internal shoulder 48 of the bearing cup 20 along a narrow, annular area to provide a third seal between the sealing member 52 and the cup 20. The lips 62 and 64, through their engagements with the cross body 28 and the shoulder 48, also retain the seal 50 in proper sealing position. The lips 54–64 thus provide three narrow sealing areas with the trunnion 32 and the cross body 28 and also three narrow sealing areas with the cylindrical portion 44 and the shoulder 48 of the cup 20. The lips 54, 56 and 62 primarily inhibit ingress of water and other contaminants into the cup 20 while the lips 58, 60, and 64 primarily control the flow of lubricant out of the cup 20 when lubricant is supplied to the fitting 38.

Figure 4:
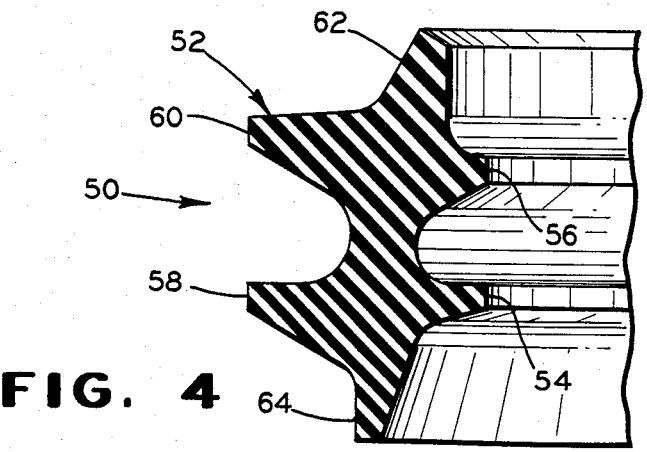
FIG. 4 is a further enlarged, fragmentary view in transverse cross section of the universal joint seal of FIG. 3.

As shown in FIG. 4, the lips preferably terminate in narrow edges having sharp or slightly rounded corners. The narrow edges provide narrow, more concentrated contact between the sealing member 52 and the cross and cup. When the sealing members are deformed as the cross and cup are assembled, the contact between the lips and the cross and cup is even narrower, being between the corners of the lips and the surfaces they engage. Thus, when the surfaces have circular irregularities thereon, the narrow contact of the lips and the surface can provide even greater sealing effectiveness that when the resilient sealing member engages the entire surface. This is particularly true when the resilient sealing member is somewhat harder, in the order of 90–95 durometers, than when the sealing member is softer with a hardness in the order of 80 durometers.

The annular cavities formed between the lips 54 and 56 and between the lips 58 and 60 trap water and contaminants tending to ingress into the cup. They also trap lubricant tending to egress from the cup with the lubricant so trapped being a further inhibition to the ingress of water and contaminants.

Figure 5:
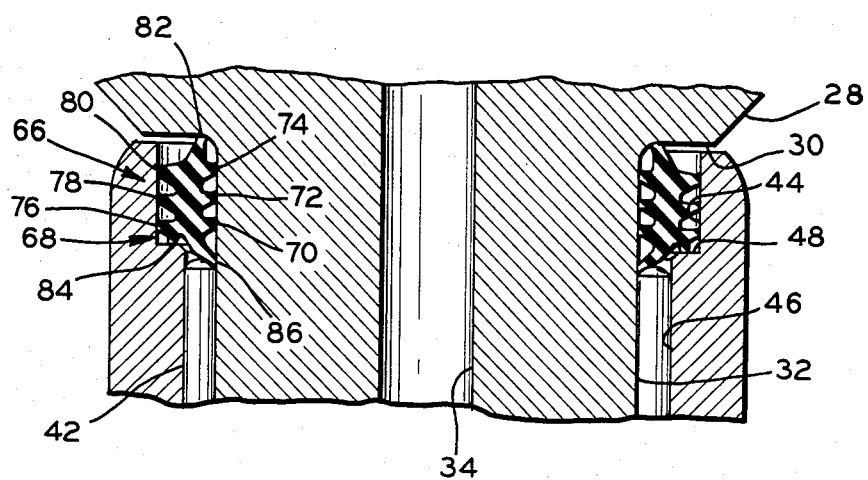
FIG. 5 is a fragmentary view in cross section of a trunnion of a universal joint cross, a bearing cup, and a modified universal joint seal according to the invention, in assembled relationship, and on the same scale as FIG. 3.
Figure 6:
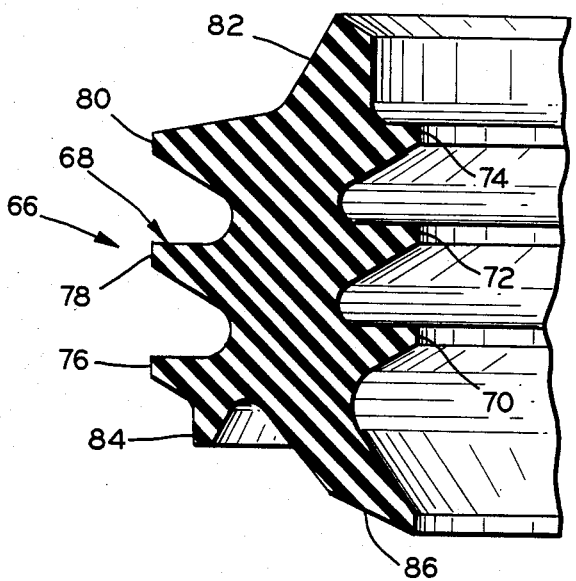
FIG. 6 is a fragmentary view in transverse cross section of the universal joint seal of FIG. 5, and on the same scale as FIG. 4.

A modified seal 66 according to the invention is shown in FIGS. 5 and 6. The seal includes a sealing member 68 having three inwardly-extending, narrow circular lips 70, 72, and 74. These engage the trunnion 32 adjacent the cross body 28 to provide three narrow sealing areas between the sealing member and the cross. The sealing member 68 also has three outwardly-extending, narrow circular lips 76, 78, and 80. These engage the first cylindrical portion 44 of the cup 20 to provide three narrow circular sealing areas between the sealing member 68 and the cup 20.

The sealing member 68 also has an upwardly-extending lip 82 between the inner and outer sets of lips with the lip 82 engaging the cross body 28 and specifically the cross body shoulder 30, in this instance. The sealing member 68 also has a downwardly-extending lip 84 between the inner and the outer sets which engages the internal shoulder 48 of the cup 20. Thus, the lips 82 and 84 retain the seal 66 in proper position as well as provide additional narrow sealing areas between the sealing member and the cross body and cup.

The sealing member 68, in this instance, also has a longer, inwardly and downwardly-extending lip 86 which engages the upper ends of the needle bearings 42 to retain them in place when the cup 20 is separated from the trunnion 32. The lip 86 also tends to direct lubricant out of the cup between the sealing member 68 and the cylindrical portion 44 when lubrication is supplied.

Figure 7:
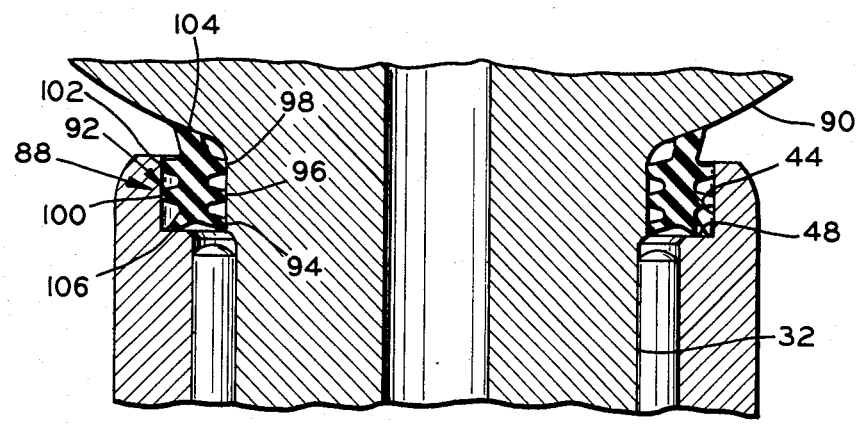
FIG. 7 is a fragmentary view in cross section of a trunnion of a universal joint cross, a bearing cup, and a further modified universal joint seal according to the invention, in assembled relationship, and on the same scale as FIG. 5.

A further modified seal 88 according to the invention is shown in FIG. 7, along with a modified cross body 90. The cross body 90 differs from the body 28 in that it has no shoulder 30 thereon but simply has the trunnion 32 extending directly from the body. The surface of the body 90 tends to be rougher than the shoulder 30, which is machined, while the body 90 as formed is normally not subsequently smoothed by any machining or grinding operation.

The seal 88 includes a sealing member 92 having three inwardly-extending, narrow circular lips 94, 96, and 98. These engage the trunnion 32 adjacent the cross body 90 to provide three narrow sealing areas between the sealing member and the cross. The sealing member 92 also has two outwardly-extending, narrow circular lips 100 and 102. These engage the first cylindrical portion 44 of the cup 20 to provide two narrow circular sealing areas between the sealing member 92 and the cup 20.

The sealing member 92, in this instance, has a thick upwardly-extending lip or ridge 104 between the inner and outer sets of lips with the lip 104 engaging the cross body 90. However, the thick lip 104 does not provide an effective seal between the sealing member 92 and cross body because of the rough surface thereof. Hence, the main function of the lip 104 is to aid in retaining the sealing member 92 in sealing position while the lips 94, 96, and 98 provide three narrow sealing areas between the sealing member and the cross body. The sealing member 92 also has a downwardly-extending lip 106 between the inner and outer sets of lips. The lip 106 engages the internal shoulder 48 of the cross 20 to provide an additional narrow sealing area between the sealing member and the cup and at the same time to cooperate with the thick lip 104 to aid in retaining the seal 88 in position. The lips 100, 102, and 106 thus also provide three narrow sealing areas between the sealing member and the cup.

From the above, it will be seen that the internal seal according to the invention provides at least two narrow sealing areas between the sealing member and the cross and at least two narrow sealing areas between the sealing member and the cup. At the same time, the sealing member has at least one additional upper lip and at least one additional lower lip which cooperate with the cross body and with the internal shoulder of the cup to retain the seal in position.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. In combination, a cross having four trunnions and annular shoulders around said trunnions, each of said shoulders lying in a plane substantially perpendicular to an axis of the associated trunnion, a bearing cup for each of said trunnions, said bearing cup having an open end which receives the associated trunnion, said bearing cup having a first interior portion of circular cross section of one diameter adjacent the open end, said cup having a second interior portion of cylindrical shape of a smaller diameter away from said open end, with an internal shoulder formed between said portions, said cup shoulder lying in a plane substantially perpendicular to an axis of the cup, with the plane of said cross shoulder and the plane of said cup shoulder being substantially parallel, a universal joint seal for each of said bearing cups, said seal comprising a resilient sealing member having a first lip extending substantially radially inwardly and engaging the associated trunnion along a narrow, annular area, said sealing member having a second lip extending substantially radially inwardly and engaging the associated trunnion along a narrow, annular area, said sealing member having a third lip engaging the associated trunnion shoulder along a narrow, annular area, said sealing member having a fourth lip extending substantially radially outwardly generally opposite said first lip and engaging said first interior portion along a narrow, annular area, said sealing member having a fifth lip extending substantially radially outwardly generally opposite said second lip and engaging said first interior portion along a narrow, annular area, and said resilient sealing member having a sixth lip engaging the cup shoulder along a narrow, annular area, said third lip and said sixth lip extending in substantially opposite directions.

2. The combination according to claim 1 characterized by said first interior portion of the cup being sufficiently deep that substantially only said third lip which engages the cross shoulder extends beyond the open end of the cup.

3. The combination according to claim 1 characterized by said fourth and fifth lips having surfaces slanting away from the cup and being effective to control the egress of lubricant from the cup between said sealing member and the cup when lubricant is supplied under pressure to the cup.

4. The combination according to claim 1 characterized by there being an additional inwardly-extending lip on each of said sealing members engaging the associated trunnion along a narrow, annular area.

5. The combination according to claim 4 characterized by there being an additional outwardly-extending lip on each of said sealing members engaging the first interior portion along a narrow, annular area.

6. The combination according to claim 1 characterized by there being bearing needles in said bearing cups, and said sealing members having additional lips extending inwardly over and in contact with ends of said bearing needles to aid in retaining them in position.

7. In combination, a cross having four trunnions, a bearing cup for each of said trunnions, said bearing cup having an open end which receives the associated trunnion, said bearing cup having a first interior portion of one diameter adjacent the open end, said cup having a second interior portion of a smaller diameter away from said open end, with an internal shoulder formed between said portions, a universal joint seal for each of said bearing cups, said seal comprising a resilient sealing member having a first lip extending substantially radially inwardly and engaging the associated trunnion, said first lip engaging the associated trunnion along a narrow, annular area, said sealing member having a second lip engaging the associated trunnion, said second lip extending substantially radially inwardly and engaging the associated trunnion along a narrow, annular area, said sealing member having a third lip engaging the cross around the associated trunnion, said sealing member having a fourth lip extending substantially radially outwardly and engaging said first interior portion along a narrow, annular area, said sealing member having a fifth lip extending substantially radially outwardly and engaging said first interior portion along a narrow, annular area, and said resilient sealing member having a sixth lip engaging the cup shoulder along a narrow, annular area, said third lip and said sixth lip extending in substantially opposite directions, said first interior portion of the cup being sufficiently deep that substantially only said third lip which engages the cross extends beyond the open end of the cup.

8. The combination according to claim 7 characterized by there being an additional inwardly-extending lip on each of said sealing members engaging the associated trunnion along a narrow, annular area.

9. The combination according to claim 8 characterized by there being an additional outwardly-extending lip on each of said sealing members engaging the first interior portion along a narrow, annular area.

10. The combination according to claim 7 characterized by said third lip which engages the cross being thicker than said first and second lips.

11. In combination, a cross having four trunnions and annular shoulders around said trunnions, a bearing cup for each of said trunnions, said bearing cup having an open end which receives the trunnion, said bearing cup having a first interior portion of circular cross section of one diameter adjacent the open end, said cup having a second, cylindrical interior portion of a smaller diameter away from said open end, with an internal shoulder formed between said portions, a universal joint seal for each of said bearing cups, said seal comprising a resilient sealing member having a first lip engaging the associated trunnion shoulder and at least two lips engaging the associated trunnion along narrow, annular areas, said sealing member having a second lip extending in a direction generally opposite to said first lip and engaging the shoulder of the associated bearing cup along a narrow, annular area, said sealing member having at least two additional lips engaging said first interior portion of the associated cup along narrow, annular areas, said first interior portion being sufficiently deep that substantially only the first lip which engages the cross shoulder extends beyond the open end of the cup.

12. The combination according to claim 11 characterized by there being needle bearings in said bearing cups, and said sealing members have additional lips extending over and into contact with ends of said needle bearings to aid in retaining them in position.

* * * * *

UNITED STATES PATENT OFFICE
CERTIFICATE OF CORRECTION

PATENT NO. : 4,530,675
DATED : July 23, 1985
INVENTOR(S) : Philip J. Mazziotti

It is certified that error appears in the above-identified patent and that said Letters Patent are hereby corrected as shown below:

Column 3, line 55, "16" should be --14--.

Column 3, line 63, "28" (second occurrence) should be --32--.

Column 5, line 15, "that" should be --than--.

Signed and Sealed this

Eighth Day of October 1985

[SEAL]

Attest:

DONALD J. QUIGG

Attesting Officer

Commissioner of Patents and Trademarks—Designate